Figure 12:
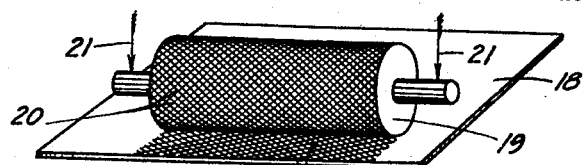

May 18, 1926.
T. K. LEWIS
1,584,747
STORAGE BATTERY ELEMENT
Filed June 28, 1922   2 Sheets-Sheet 1
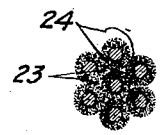
Fig. 3
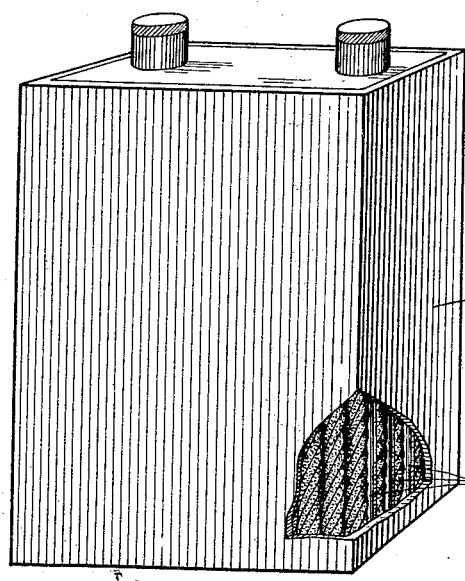
Fig. 1
Fig. 5
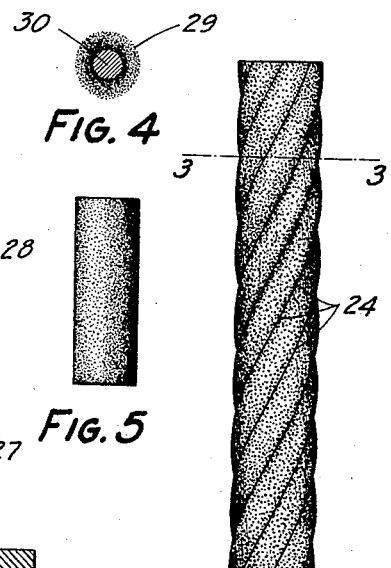
Fig. 4
Fig. 2
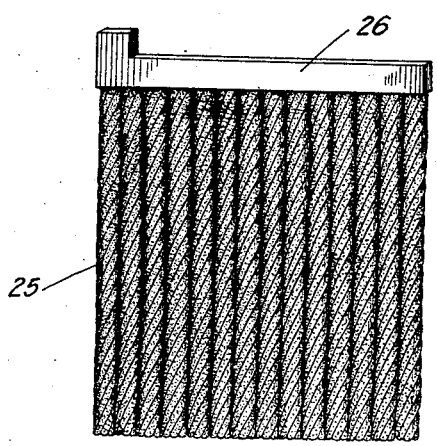
Fig. 10
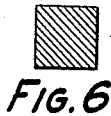
Fig. 6
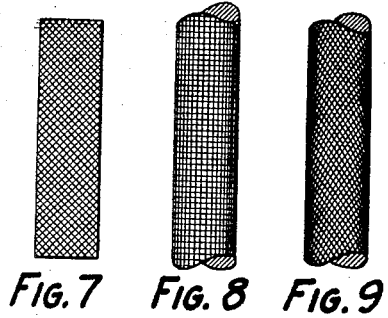
Fig. 7   Fig. 8   Fig. 9
Fig. 11
INVENTOR
Thomas K. Lewis,
BY
ATTORNEY May 18, 1926.

T. K. LEWIS 1,584,747

STORAGE BATTERY ELEMENT

Filed June 28, 1922    2 Sheets-Sheet 2

INVENTOR
Thomas K. Lewis

ATTORNEY

Patented May 18, 1926.

1,584,747

UNITED STATES PATENT OFFICE.

THOMAS K. LEWIS, OF ALBANY, NEW YORK.

STORAGE-BATTERY ELEMENT.

Application filed June 28, 1922. Serial No. 571,503.

My invention relates to storage batteries and particularly to the elements or plates thereof; and its objects are to provide a battery which will have an ampere-hour capacity, per unit of weight, and per unit of volume, in excess of those now known in the art; which may be charged or discharged at a high rate without injurious results such as heating, or buckling of the elements; which may be formed in a much shorter time than is usually required; and which may be manufactured at a low cost.

In attaining these objects, my invention contemplates the use of lead plates, bars, or wires which are relatively thin, or of small cross-sectional area, although it is possible to increase the efficiency of the ordinary paste filled grid or other lead element by treating the surface of the lead according to my method.

It is well known that the chemical changes which take place during the charging and discharging of a storage battery occur wholly upon the surfaces, or, on the portions of the elements which are in contact with the electrolyte, and that these changes, when the battery is charged or discharged at a high rate of speed, evolve considerable heat. In addition to the excessive heat which is generated under these conditions, structural stresses are set up in the elements which produce a distortion or buckling, sometimes sufficient to destroy the elements by short circuiting or, to break the container. To overcome these disadvantages, in addition to using an element which is relatively thin or of small cross-sectional area, and therefore more or less flexible, I propose to treat the surface or outer portions of the element in such a way that the character thereof is mechanically changed from the usual smooth, dense texture or consistency found in lead shapes as prepared by melting, casting, rolling and drawing, so that it becomes uniformly porous, granular, open and spongy. By thus preparing the surface I not only secure an absolutely uniform distribution of the chemically active material but I also secure uniform distribution of the buckling stresses thereby minimizing the distortion. The open or porous surface also forms a very efficient heat absorber and distributor by reason of the fact that the electrolyte can freely permeate the minute interstices and be cooled by direct contact.

These and other features and advantages will be apparent to those skilled in the art from a consideration of the drawings in connection with the following description. In referring to the drawing it should be borne in mind that for the purpose of clearness the individual wires and units which make up the element are drawn to a greatly enlarged scale, and that the surface as shown is more or less conventional in character.

Similar numerals refer to similar parts throughout the several views.

Figure 13:
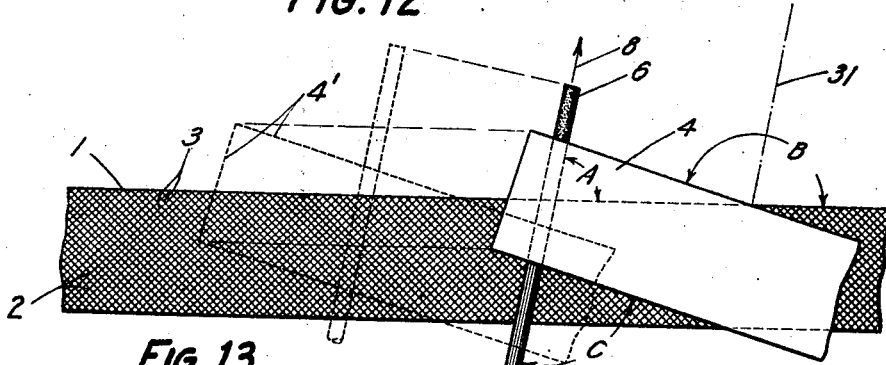
Figure 14:
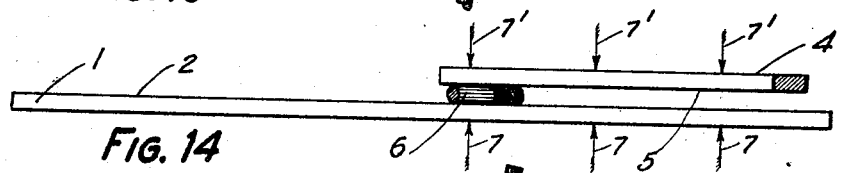
Figure 15:
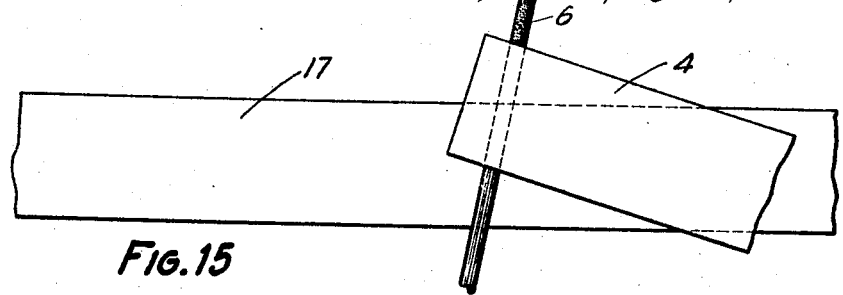
Figure 16:
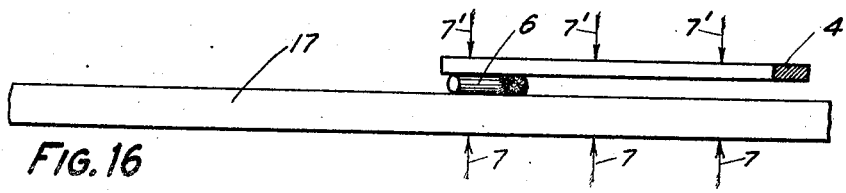

Fig. 1 is a perspective view of a complete cell having a corner of the container broken away to show the arrangement of the elements and spacers; Fig. 2 is an elevation view of a completed cable or unit; Fig. 3 is a sectional view of a unit on the line 3—3 of Fig. 2; Fig. 4 is a sectional view of a single wire, showing the relative depth of metal affected by my treatment; Fig. 5 is an elevation view of a round wire; Figs. 6 and 7 are section and elevation views, respectively, of a modified form of wire, showing in Fig. 7 a partially treated surface; Figs. 8 and 9 are elevation views of a round wire at an early stage of the treatment; Fig. 10 is a perspective view of my preferred form of element; Fig. 11 is a fragmentary perspective view of an attenuated, sheet lead element; Fig. 12 is a perspective view illustrating the preparation of a flat element; Figs. 13 and 14 are plan and elevation views, respectively, illustrating the preferred method of treating the surface of a round wire; Figs. 15 and 16 are plan and elevation views, respectively, illustrating a modified method of treating the surface of a round wire.

In preparing my element I prefer to use a round lead wire of comparatively small diameter. The size of the wire which I select depends, to some extent, upon the uses for which the battery is intended. For example, a battery intended to supply large currents would be constructed from larger wires than one intended to supply currents only a few milli-amperes in volume. Likewise batteries to supply the cheaper trade would be manufactured from larger wires or from thin plates. It will be obvious however, that a battery constructed from very small wires will have a greater ampere-hour capacity per unit of weight or unit of volume, because a greater portion of lead can be made chemically active. While I do not wish to limit the scope of my invention in any way to wires of relatively small diameter or to relatively thin plates, I have found in practice that No. 16 gauge (B&S) lead wire, having a diameter of about 0.05 inches forms a very efficient element. A battery manufactured from this size of wire which is treated according to my method will have no portion of the lead more than two-hundredths of an inch from the electrolyte and may be subjected to any test of rapid charging and discharging—even short circuited, or the charging current reversed—without producing any excessive heating, buckling or other permanently harmful effects. In preparing the surface of the wire the stock may be cut in convenient lengths before treating, or it may be drawn directly from a source of supply and cut to the proper length after treatment.

Referring to Figs. 13 and 14, the numeral, 1, represents a base member having a hard metallic surface, 2, which is preferably uniformly cut or roughened to present sharp cutting, or indenting edges or teeth, 3, similar to an ordinary file. 4 is an upper member having its lower surface, 5, hardened and cut or roughened similar to the surface, 2, of member 1, and arranged in a plane parallel thereto. The end of the wire stock, 6, is inserted between the surfaces, 2 and 5, and the members, 1, and 4, are moved relatively to each other so that the member 4, at some time, occupies and passes through the position designated by the dotted lines at 4′. During the movement the surfaces, 2 and 5, are forced in the direction of the arrows, 7 and 7′ respectively, against the diametrically opposite elements of the cylindrical stock, 6, by any convenient means, and with a force sufficient to secure an indentation or marking of the surface of the stock by the cutting edges or teeth on the surfaces, 2 and 5. This force however must not be so great as the crush or distort the cylindrical stock.

It will be evident that the cylindrical stock, 6, will be tangent to, and roll upon both the surface, 2, and the surface 5, and that any particular point on the stock will be alternately forced against the surfaces 2 and 5, and kneaded thereby. In order that the stock may progress axially in the direction of the arrow, 8, and pass out from between the surfaces, 2 and 5, when it has been sufficiently kneaded or worked, I prefer to arrange the axis of the stock at an acute angle, A, with the direction of the relative movement of the members 1, and 4, and although it is not essential, I also prefer to arrange the upper member, 4, in such a way that the axis of the stock, 6, is parallel to the bisector, 31, of the obtuse angle, B, formed between the side limits of members, 1, and 4.

The edges or teeth, 3, may, of course, be arranged at any angle to each other, or one set of parallel edges may be omitted. It will be evident however, when the edges, 3, are arranged as shown in Fig. 13, the initial markings upon the stock will be a series of intersecting helices as illustrated in Figs. 8 and 9. The pitch of the helices may, in any specific case, vary from zero to infinity, depending upon the angles between the edges 3, and the axis of the stock.

This process may be successively carried out by hand by using two ordinary flat files and rolling the stock between them as shown in Figs. 13 and 14. As the stock rolls, between the surfaces, 2 and 5, every portion of its surface is displaced and pushed about, many times, as it comes in contact with the roughened surfaces, 2 and 5, so that its character is mechanically changed from a dense, homogeneous texture, to a uniformly open, granular or spongy texture.

Although I prefer to treat the outer portions of round stock as above described, a somewhat less satisfactory result can be attained by omitting one of the file-like surfaced members, 1 and 4, and substituting therefor, a yielding, elastic, medium, such as rubber, felt, wood, or the like, which will have sufficient resistance to allow the stock to be compressed against and kneaded by the remaining file-like surfaced member, and yet be sufficiently yieldable and elastic to allow the stock to be rolled thereon under the necessary cutting and indenting pressure without smoothing it to its original consistency or texture. Figs. 15 and 16 illustrate the substitution of such a medium, 17, for the base member, 1.

In Fig. 12, illustrating the preparation of a flat surface, 18, represents a lead plate or element, and 19, represents a cylindrical metallic roller, having a hardened, roughened surface preferably provided with file-like or milling teeth, 20. This roller, obviously may be of any convenient length and diameter. By applying a sufficient pressure in the direction of the arrows, 21, and rolling the cylinder over the plate, the metal near the surface of the plate will be displaced as shown at 22. The roller is passed over the plate in this manner in a plurality of directions until the plate represents a uniform appearance, and every particle of the 'ead near the surface has been displaced, and the character of the surface changed to a uniformly open, granular or spongy state.

In completing the construction of my element in its preferred form, as shown in Fig. 10, I take a number of wires which have been treated as above described, and entwine them into a compact cable or unit as shown in Fig. 2. Any number of wires may be used to make up a unit, but I prefer to use seven, which naturally makes the most compact cable and yet has clear minute passages, 23, between the individual wires to admit the electrolyte and permit the dissipation of the heat and gases. The spongy surface of the wire also provides capillary passages between the separate wires, as at 24, and permits the free passage of the electrolyte therebetween. Any number of these units may be assembled to form the element 25, as shown in Fig. 10. I prefer to place them side by side in a single row and attach them together, at the top only, by burning them into the lead bar, 26, in the usual way. The elements may be assembled in the usual way with separators, 27, between each element, and placed in a container 28, with a sulphuric acid electrolyte.

Where a very compact battery of high voltage and low ampere-hour capacity is required for experimental or other work, it is obvious that elements composed of single wires, as illustrated in Figs. 4 and 5, may be used to advantage.

An element as shown in Fig. 10, constructed from No. 16 ga. wire and 4″ by 5″ in size has a chemically active surface area in excess of 146 square inches, and weighs about 0.75 pounds. A plate of the ordinary paste type of the same size, and occupying the same over all volume has a surface area of about 42 square inches and weighs about 1.25 pounds. In other words, an element of my preferred type, occupying the same space as a lead paste type element, has a chemically active surface area more than threee and one-half times larger and weighs only three-fifths as much. Or for the same ampere-hour capacity, my cell will occupy less than two-sevenths the volume of a paste type cell and will weigh only one-sixth as much.

I find that by constructing a cell from my form of element that its volume may be materially reduced; first, because the elements may be placed very close to the sides of the container, due to the fact that they are flexible and cannot buckle; and second, because of the space saved by using only a small volume of lead per ampere-hour capacity.

From the foregoing it will be evident that while I have provided an element having a large surface area, which may be made chemically active, I have also provided a very compact element of great porosity. In elements composed of fine wires, my treatment kneads or works the metal to a considerable depth, as shown at 29, in Fig. 4, and leaves the center core, 30, of each wire in its initial condition to provide structural strength.

By uniformly kneading or working the surface portions of the individual wires, I greatly increase their flexibility which permits the elements, as assembled in a cell, to be easily retained in their original assembled relation, because they cannot develop sufficient internal force under the effect of the buckling stresses to produce distortion.

By constructing my element, in its preferred form, from separate flexible cables or units, secured at one end only, I further reduce the tendency to buckle because I break up and distribute the buckling stresses so, that under their effect, the element cannot act as a structural unit.

It is also to be noted, that in treating the surface of the lead, no part of the lead is removed; it is simply worked over many times much like a plough turns over the earth in the field.

I wish it to be understood that wherever I have used the words "surface" and "surface treatment" in describing and claiming my invention, I mean not only the extreme outer layer of the lead and its treatment but also a considerable portion of the metal near the exterior of the stock. I also intend that the word "wire" shall include attenuated rods or bars produced by other means than drawing.

I am aware that it has been proposed to increase the surface area of lead plates and facilitate the "forming" thereof by scratching them with a knife or the like; and that E. Ducretet, in a communication published in "La Lumiere Electrique", volume 4, page 271, August 27, 1881, suggests that lead plates having very deep irregularities, forming a square design with sharp summits may be prepared by passing the plates between rolls having their surfaces cut in rough lines. But my invention contemplates something more than merely increasing the surface area. It contemplates a change in the character of the lead itself from a solid, homogeneous metal to a porous, granular mass. And my elements, instead of being covered with deep irregularities having sharp summits, as described by Ducretet, are comparatively smooth and the irregularities are microscopic in character.

What I claim is:

1. As an article of manufacture adapted for use as a storage battery element, a cable comprising a plurality of entwined lead wires; said wires having integral outer portions of spongy lead.

2. In a storage battery element, the combination with a common terminal, of a plurality of flexible lead cables in closely assembled relation and attached thereto, but freely separable from each other at all other points.

3. A storage battery element comprising a plurality of lead wires, said wires having integral exterior portions of spongy lead.

4. A storage battery element comprising a plurality of compactly assembled, flexible cables; said cables comprising a plurality of lead wires entwined together, and said wires having integral surface portions of spongy lead.

5. A storage battery element comprising a plurality of flexible cables; said cables comprising a plurality of strands of lead wire having outer portions composed of porous lead; the said cables being compactly assembled and secured at one end, and freely separable at all other points.

6. As an article of manufacture to be formed for use in storage battery elements, attenuated lead having integral exterior portions of kneaded lead.

7. As an article of manufacture, lead wire having its outer portions composed of spongy lead.

8. As an article of manufacture, lead wire having a core of solid lead, surrounded by a surface of spongy lead integral with said core.

9. A storage battery element having a portion adapted to be rendered chemically active comprising kneaded, metallic lead.

THOMAS K. LEWIS.